US012421776B2

(12) United States Patent
Wantland

(10) Patent No.: US 12,421,776 B2
(45) Date of Patent: Sep. 23, 2025

(54) THIMBLE SYSTEM FOR USE WITH COMMON AXIS DOOR-IN-DOOR ASSEMBLIES

(71) Applicant: Haier US Appliance Solutions, Inc., Wilmington, DE (US)

(72) Inventor: Louis A. Wantland, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 131 days.

(21) Appl. No.: 18/482,550

(22) Filed: Oct. 6, 2023

(65) Prior Publication Data

US 2025/0116140 A1 Apr. 10, 2025

(51) Int. Cl.
*E05D 3/04* (2006.01)
*E05D 7/081* (2006.01)
*F25D 23/02* (2006.01)

(52) U.S. Cl.
CPC ............. *E05D 3/04* (2013.01); *F25D 23/028* (2013.01); *E05D 7/081* (2013.01); *E05Y 2600/51* (2013.01); *E05Y 2900/31* (2013.01); *F25D 2323/023* (2013.01); *F25D 2323/024* (2013.01)

(58) Field of Classification Search
CPC ......... F25D 2323/023; F25D 2323/024; F25D 23/028
See application file for complete search history.

(56) References Cited

U.S. PATENT DOCUMENTS 2,150,064 A 3/1939 Robert et al.
3,089,202 A * 5/1963 Pulaski ............... E05D 11/0081 49/167
8,388,078 B2 3/2013 Kwon et al.
8,424,985 B2 4/2013 Kwon et al.
8,544,973 B2 10/2013 Kwon et al.
9,170,045 B2 10/2015 Oh et al.
9,175,901 B2 11/2015 Oh et al.
9,568,238 B2 2/2017 Kim et al.
RE48,733 E 9/2021 Oh et al.
11,578,519 B2 2/2023 Park et al.
2006/0143860 A1* 7/2006 Park ...................... F25D 23/028 16/243
2012/0038257 A1* 2/2012 Kim .................... E05B 65/0042 292/109

(Continued)

FOREIGN PATENT DOCUMENTS

CN 105466120 A * 4/2016 ........... F25D 23/028
CN 111119625 A * 5/2020 ............. E05D 7/043

(Continued)

OTHER PUBLICATIONS

Translation CN218347162U (Year: 2023).*
Translation CN113482472B (Year: 2023).*

*Primary Examiner* — Andrew Roersma
(74) *Attorney, Agent, or Firm* — Dority & Manning, P.A.

(57) ABSTRACT

A hinge assembly for a door-in-door assembly includes a door plate, a cabinet plate, and a thimble. The thimble has a wall having an inner bearing surface and an outer bearing surface, the inner bearing surface defining a first passage. The door plate is supported for rotation at the outer bearing surface. The cabinet plate includes a pivot pin that is supported for rotation at the inner bearing surface.

20 Claims, 6 Drawing Sheets

(56) References Cited

U.S. PATENT DOCUMENTS

| | | | | |
|---|---|---|---|---|
| 2013/0249371 | A1* | 9/2013 | Lively | F25D 23/028<br>312/405 |
| 2014/0132144 | A1* | 5/2014 | Kim | E05D 11/0081<br>312/405 |
| 2024/0044570 | A1* | 2/2024 | Dong | F25D 23/028 |

FOREIGN PATENT DOCUMENTS

| | | | | | |
|---|---|---|---|---|---|
| CN | 213898574 | U | | 8/2021 | |
| CN | 113482472 | B | | 1/2023 | |
| CN | 218347162 | U | | 1/2023 | |
| CN | 218495577 | U | | 2/2023 | |
| DE | 3836910 | A1 | * | 5/1990 | F25D 23/028 |
| JP | 2001272162 | A | * | 10/2001 | F25D 23/02 |
| KR | 1020150000102 | A | * | 1/2015 | F25D 23/028 |
| WO | WO-2018126566 | A1 | * | 7/2018 | F25D 23/02 |

* cited by examiner

THIMBLE SYSTEM FOR USE WITH COMMON AXIS DOOR-IN-DOOR ASSEMBLIES

FIELD OF THE INVENTION

The subject matter of the present disclosure relates generally to door-in-door refrigerator appliances. In particular, the present subject matter relates to a two-sided thimble system for door-in-door refrigerator appliances having a common axis of rotation.

BACKGROUND OF THE INVENTION

Refrigerator appliances generally include a cabinet that defines a food storage chamber. In addition, refrigerator appliances also generally include a door rotatably hinged to the cabinet to permit selective access to food items stored in the fresh food storage chamber. Certain refrigerator appliances, commonly referred to as door-in-door refrigerator appliances, may include a frame door forming a food storage chamber positioned within the door and selectively accessible through an outer door rotatably hinged to the frame door. Alternatively, the outer door may be securely latched to the frame door in the closed position and the frame door and outer door may be rotated together as a full door to provide access to the fresh food storage chamber.

In refrigerators having a door-in-door system, it is often desirable to provide a common axis of rotation for the outer door and the frame door. For example, a common axis door-in-door assembly may provide separate rotation control for the frame door and the outer door. However, some common axis door-in-door units include complex hinge assemblies with multiple parts. Such hinge assemblies on door-in-door units may be difficult and time-consuming to install, increase the number of required parts, and increase the occurrence of product failures. Accordingly, a hinge assembly for a door-in-door refrigerator that addresses the mentioned shortcomings may be beneficial.

BRIEF DESCRIPTION OF THE INVENTION

Aspects and advantages of the invention will be set forth in part in the following description, may be apparent from the description, or may be learned through practice of the invention.

In one exemplary aspect, a hinge assembly for a door-in-door configuration is provided. The hinge assembly comprises a door plate defining a thickness, a cabinet plate defining a thickness, and a thimble defining a thimble axis and comprising a wall having an inner bearing surface and an outer bearing surface, the inner bearing surface defining a first passage, and wherein the door plate is supported for rotation at the outer bearing surface and the cabinet plate is supported for rotation at the inner bearing surface.

In another exemplary aspect, a door-in-door assembly for a cabinet defining a chamber and an opening to the chamber is provided. The door-in-door assembly comprises an inner door defining an upper rotational bore and a lower rotational bore, an outer door, and an upper hinge assembly comprising an upper thimble comprising an inner bearing surface defining a first passage and an outer bearing surface, wherein a first portion of the upper thimble is received in the upper rotational bore. An upper door plate defining a thickness and a first aperture through the thickness is further provided, a portion of the outer bearing surface received for rotation in the first aperture. An upper cabinet plate comprising an upper pivot pin is provided, the upper pivot pin received in the first passage, and wherein the outer door is supported for rotation at the outer bearing surface of the upper thimble and the inner door is supported for rotation at the inner bearing surface of the upper thimble.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
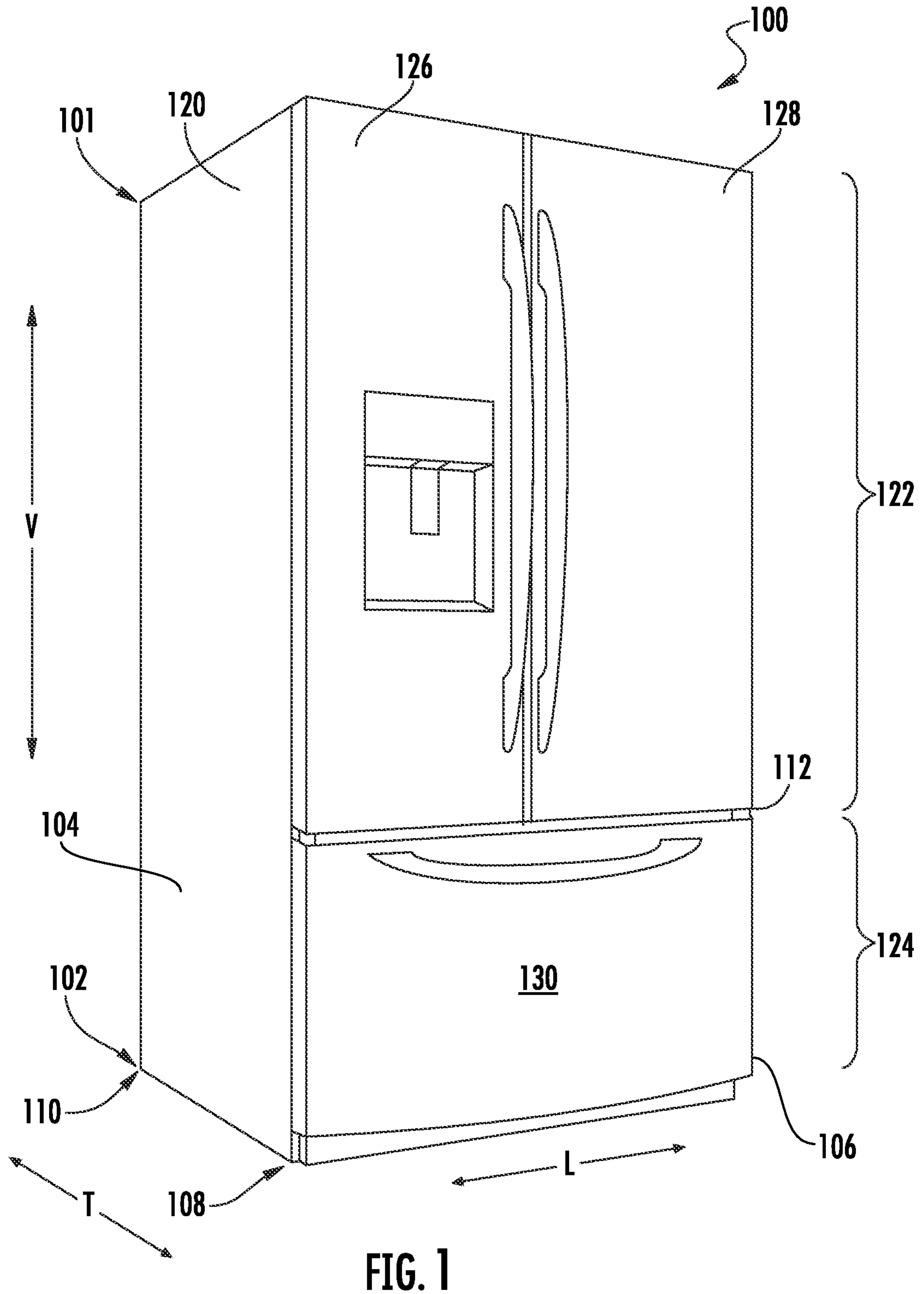
FIG. 1 provides a perspective view of a refrigerator appliance according to exemplary embodiments of the present disclosure with refrigerator doors and a freezer door shown in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
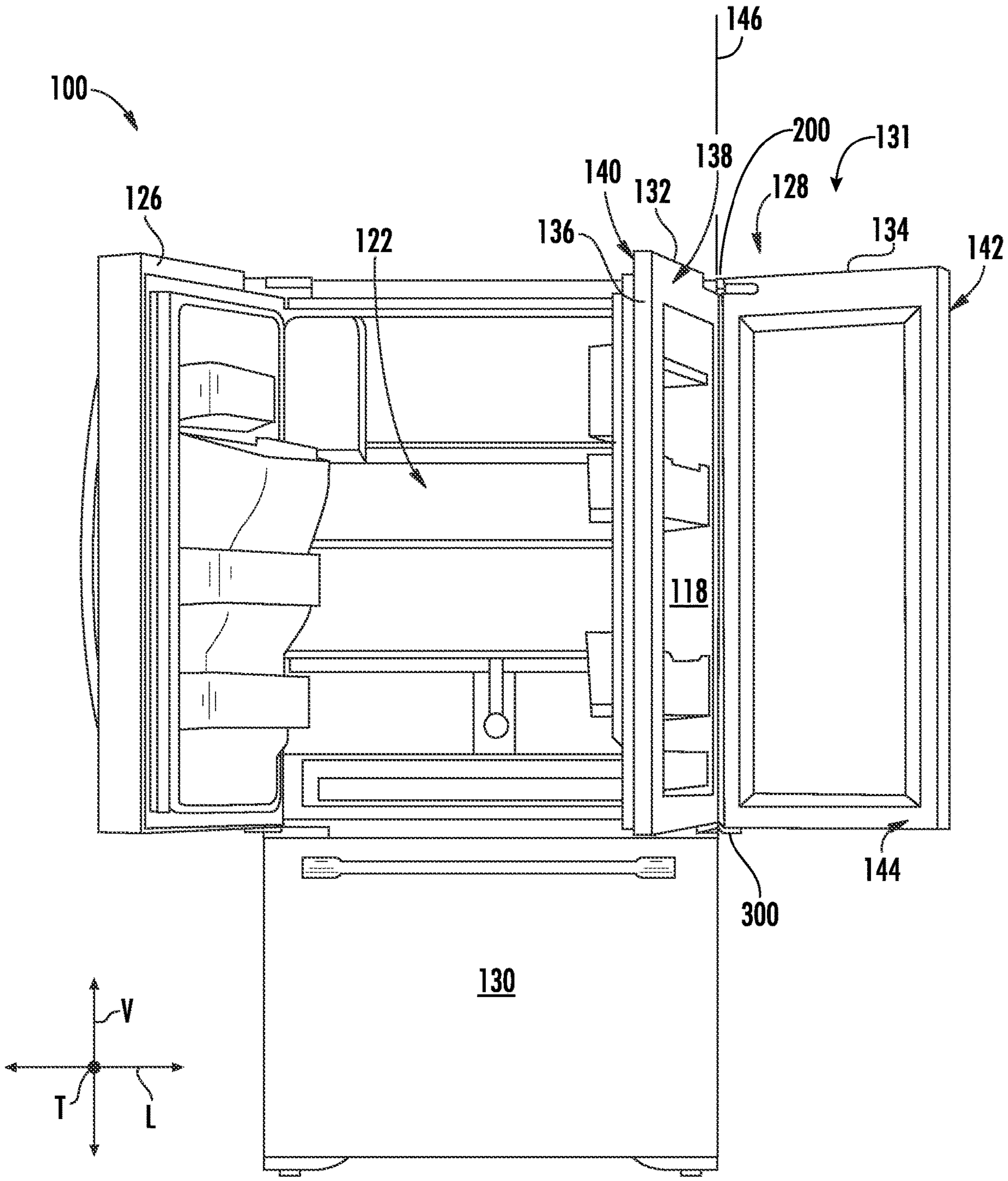
FIG. 2 provides a front elevation view of the refrigerator appliance of FIG. 1 with refrigerator doors shown in an open position.

FIG. 1 provides a perspective view of a refrigerator appliance 100 according to exemplary embodiments of the present subject matter. FIG. 2 provides a front elevation view thereof with the chamber doors shown in an open position. As shown in FIG. 1, refrigerator appliance 100 includes a cabinet 120 that extends between a top 101 and a bottom 102 along a vertical direction V. Cabinet 120 also extends between a first side 104 and a second side 106 along a lateral direction L and between a front 108 and a rear 110 along a transverse direction T. Vertical direction V, lateral direction L, and transverse direction T are mutually perpendicular and form an orthogonal direction system.

Cabinet 120 defines chilled chambers for receipt of food items for storage. In particular, cabinet 120 defines a refrigerated chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure matter apply to other types and styles of refrigerator appliances, such as e.g., top mount refrigerator appliances, side-by-side style refrigerator appliances, and wine storage refrigerators. Moreover, the benefits of the present disclosure matter may likewise apply to freezer appliances, e.g., upright freezers. Consequently, the description set forth herein is for exemplary purposes only and is not intended to be limiting in any aspect to any particular type of consumer appliance.

For this embodiment, refrigerator doors, hereinafter doors 126, 128, are configured in a French door configuration and are rotatably hinged or mounted to an edge of cabinet 120 for selectively accessing refrigerated chamber 122. Door 126 (i.e., left door) is rotatably mounted or hinged to cabinet 120 at first side 104 of cabinet 120. Door 128 (i.e., right door) is rotatably mounted or hinged to cabinet 120 at the right, or second side 106 of cabinet 120. More specifically, door 128 is rotatably mounted to cabinet 120 via upper hinge assembly 200 located at the top 101 front 108 corner of the door 128 and a lower hinge assembly 300 located at the lower portion 112 of door 128 (both hinges to be described in greater detail below). In some embodiments, door 126 may be attached to the cabinet 120 with hinge assemblies similar to upper and lower hinge assemblies 200, 300. In FIG. 1, doors 126, 128 are shown in a closed position. In FIG. 2, doors 126, 128 are shown in an open position.

As shown in FIG. 2, door 128 comprises a door-in-door assembly 131. As such, door 128 includes inner door 132 and an outer door 134, both of which are shown in an open position in FIG. 2. In other embodiments, door 126 can likewise have a door-in-door configuration. In this way, one or both of doors 126, 128 can have door-in-door configurations. In general, a door-in-door type refrigerator appliance door provides an outer door enclosing a door compartment within a door frame or inner door, the outer door providing controlled access to the door compartment. The door-in-door type door also provides a door assembly, including the outer door and the inner door, that provides controlled access to a refrigerated compartment within the cabinet. As illustrated and discussed in the present disclosure, the right-side door, door 128, for refrigerated chamber 122 is used to illustrate features of the present disclosure. This is for convenience only, as one of ordinary skill in the art will recognize that the disclosed features can be applied to other door locations, such as door 126 or a hinged freezer chamber door (not shown). Accordingly, illustrations and discussions of the right-side door-in-door arrangement are for illustration only and not intended to be limiting.

Inner door 132 includes a door frame 136 that has an outer surface 138 and an opposing inner surface 140 that faces toward refrigerated chamber 122 when inner door 132 is in a closed position. Inner door 132 is rotatably hinged to cabinet 120, e.g., such that inner door 132 is movable between a closed position (FIG. 1) and an open position (FIG. 2) to permit selective access to refrigerated chamber 122. In particular, inner door 132 can be rotatably coupled or mounted directly to cabinet 120 at the second side 105 of cabinet 120 via upper and lower hinge assemblies 200, 300. Inner door 132 defines an opening extending through the outer and inner surfaces 138, 140 of frame 136 and may extend into refrigerated chamber 122. Frame 136 extends around a perimeter of the opening defined by inner door 132 and forms a food storage area 118 located in the door-in-door assembly 131. Frame 136 can extend into the refrigerated chamber 122 when inner door 132 is in the closed position.

Outer door 134 includes an outer surface 142 and an opposing inner surface 144. The outer surface 142 faces an exterior of refrigerator appliance 100 and inner surface 144 faces toward refrigerated chamber 122 or toward the interior of refrigerator appliance 100 when outer door 134 is in the closed position. As shown, outer door 134 is rotatably coupled or hinged to inner door 132 via upper and lower hinge assemblies 200, 300. In particular in the present embodiment, inner door 132 and outer door 134 are both rotatably coupled with hinge assemblies 200, 300. In this way, door-in-door refrigerator appliance door assembly 131 (including inner door 132 and outer door 134) is directly rotatably coupled with the opening defined by inner door 132. In some embodiments, outer door 134 permits selective access to a food storage area 118 formed in the door-in-door assembly 131. When in a closed position, a portion of outer door 134 can be received within frame 136 of inner door 132.

Inner and outer doors 132, 134 can generally move in the same direction. Specifically, inner and outer doors 132, 134 can each move away or swing out from refrigerated chamber 122 of refrigerator appliance 100 when moving toward their respective open positions, or the fully open position for inner and outer doors 132, 134. Moreover, inner and outer doors 132, 134 can each move toward refrigerated chamber 122 of refrigerator appliance 100 when moving toward their respective closed positions. As illustrated, door assembly 131 (i.e., inner and outer doors 132, 134) rotate about an axis 146 in a clockwise direction (when viewed vertically downward along axis 146) to close the doors 132, 134, and rotate in a counterclockwise direction to open the doors 132, 134.

In some embodiments, refrigerator appliance 100 includes a gasket positioned on inner surface 144 of outer door 134. As outer door 134 moves toward the closed position, outer door 134 can compress the gasket against outer surface 138 of inner door 132. Specifically, the gasket may seal against outer surface 138 of inner door 132 to enclose refrigerated chamber 122. In alternative embodiments, the gasket can be positioned on outer surface 138 of inner door 132, and as outer door 134 moves toward the closed position, inner door 132 can compress the gasket against inner surface 144 of outer door 134. More specifically, the gasket can seal against inner surface 144 of outer door 134. It should be appreciated that the gasket can be formed of any suitable material. For example, in some embodiments, the gasket can be formed of a resilient rubber or plastic material.

As further shown in FIGS. 1 and 2, a freezer door 130 is arranged below doors 126, 128 for selectively accessing freezer chamber 124 (FIG. 1). Although freezer door 130 is configured as a pull-out drawer in FIGS. 1 and 2, in other exemplary embodiments, refrigerator appliance 100 can include one or more freezer doors that are rotatably hinged or mounted to housing 102 in the same or similar fashion as doors 126, 128. In some embodiments, hinged freezer doors may include door-in-door features. For example, in a side-by-side refrigerator, the chilled chamber is vertically segmented with a freezer compartment on one side and a refrigerator compartment on the other. As such, the doors 126, 128 may extend from the top 101 to the bottom 102 of the cabinet 120, with door 126 pivoted on the left and door 128 pivoted in the right. In such a configuration, either or both doors 126, 128 may include a door-in-door assembly similar to door-in-door assembly 131.

Figure 3:
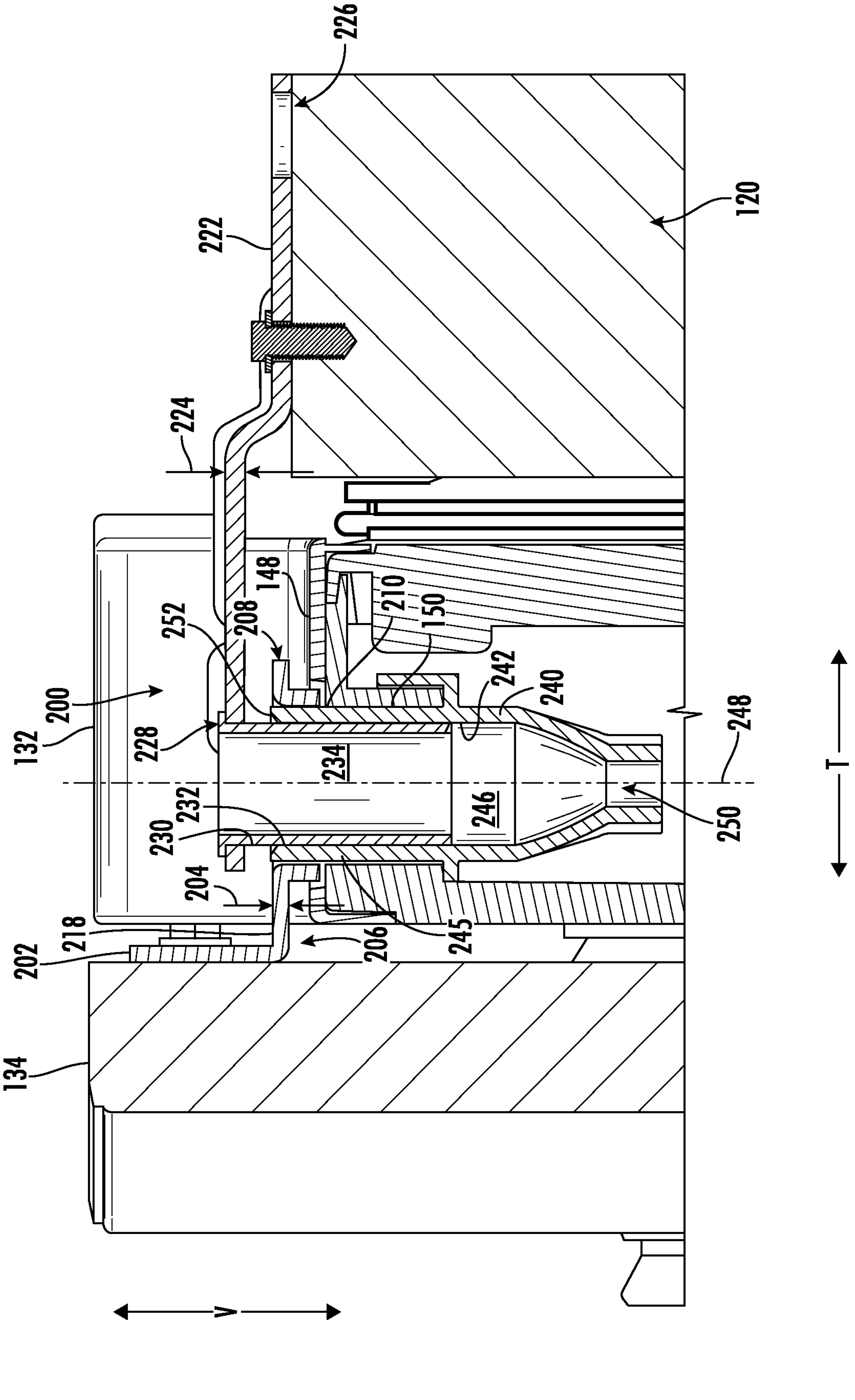
FIG. 3 provides a side sectional view of a hinge assembly mounted to a door-in-door assembly in accordance with an embodiment of the present disclosure.
Figure 6:
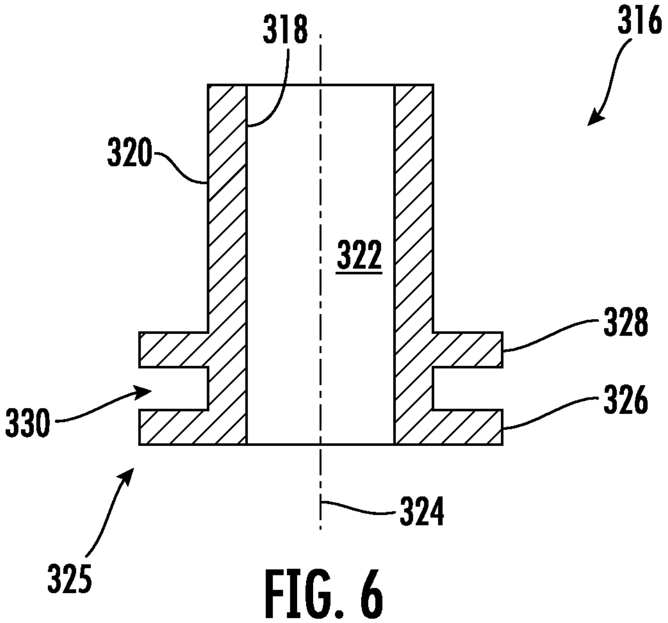
FIG. 6 represents a sectional view of a thimble in accordance with an embodiment of the present disclosure.

Embodiments of the hinge assemblies according to present disclosure may be used as upper or lower hinge assemblies to allow the inner door 132 and the outer door 134 to pivot about the same axis 146. For example, FIG. 3 is illustrative of a hinge assembly 200, in accordance with the present disclosure, that may be used at an upper hinge location to attach an upper portion of a door-in-door assembly 131 to a cabinet 120. Similarly, FIG. 6 is illustrative of a hinge assembly 300, in accordance with an embodiment of the present disclosure, that may be used at a lower hinge location to attach a lower portion of a door-in-door assembly 131 to a cabinet 120.

Figure 4:
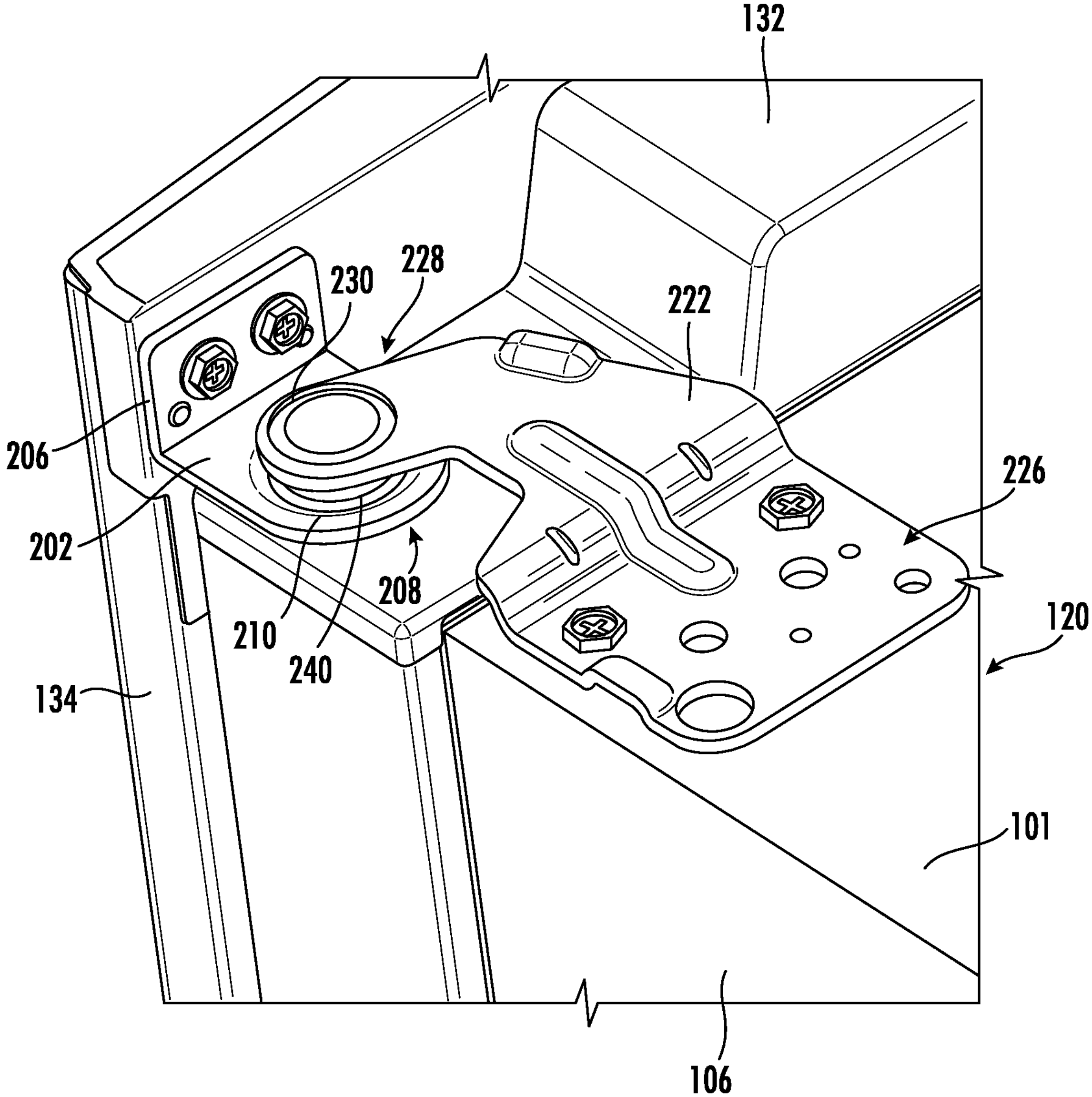
FIG. 4 provides a perspective view of the hinge assembly of FIG. 3.

FIG. 3 represents a sectional view of a hinge assembly 200 disposed at a top 101 second (right) side 106 of the exemplary refrigerator 100 of FIG. 2. As illustrated, assembly 200 includes a door plate 202 defining a thickness 204, a first end 206 adapted for attachment to an outer door 134, and a first aperture 210 formed at the second end 208 of the door plate 202. FIG. 4 is a perspective view of hinge assembly 200. As illustrated, first end 206 of the door plate 202 is fixedly attached to outer door 134. First aperture 210 is formed through the thickness 204 of door plate 202 at the second end 208.

As further illustrated in FIGS. 3 and 4, hinge assembly 200 also includes a cabinet plate 222 defining a thickness 224, a first end 226 configured for attachment to the cabinet 120, and a second end 228. A pivot pin 230 may be formed with, or affixed to, the cabinet plate 222 proximate to the second end 228 such that the pivot pin 230 extends in a vertically downward direction from the cabinet plate 222 when the cabinet plate 222 is properly positioned at the top 101 right, or second side 106, hinge location. In embodiments, the pivot pin 230 is rotationally fixed to the cabinet plate 222. For example, in embodiments in which the pivot pin 230 is formed separately from the cabinet plate 222, the pivot pin 230 may be affixed to the cabinet plate 222 by joining techniques, such as welding, interference fitting, or adhesive bonding.

As best shown in FIG. 3, a thimble 240 is provided, the thimble 240 comprising a thimble wall 242 having an inner bearing surface 244 and an outer bearing surface 245. The thimble 240 defines a thimble axis 248 and the inner bearing surface 244 defines a first passage 246 extending the vertical length of the thimble 240. In the illustrative hinge assembly 200 of FIG. 3, a portion of the thimble 240 proximate to the vertically upper end 252 is received for rotation in the first aperture 210 of door plate 202. The door plate 202 is supported for rotation about the thimble axis 248 at outer bearing surface 245. In some embodiments, the upper end 252 of the thimble 240 may be coplanar with the upper surface 218 of the door plate 202. In other embodiments, the thimble upper end 252 may extend beyond the upper surface 218.

As illustrated, the cabinet plate 222 is supported at the inner bearing surface 244 of the thimble 240. In particular, the pivot pin 230 is received for rotation in the first passage 246 to support the cabinet plate 222 for rotation about the thimble axis 248. A portion of the pivot pin is received in the length of the first passage 246 of the thimble 240. The pivot pin may be supported by the inner bearing surface 244 of the thimble wall 242 for rotation about thimble axis 248 or axial (i.e., vertical) displacement along the axis 248. As illustrated, the first aperture 210, the thimble 240, and the pivot pin 230 are positioned in a coaxial arrangement along thimble axis 248, and are rotatable about the thimble axis 248.

In the illustrative embodiment of FIG. 3, pivot pin 230 is a hollow pin comprising a wall 232 defining a second passage 234 formed through the vertical length of the pivot pin 230. When the pivot pin 230 is accepted in the first passage 246 of the thimble 240, the first passage 246 and the second passage 234 of the pivot pin may be axially aligned along thimble axis 248 and cooperate to form a conduit 250. The conduit 250 may be used to route communication or electric power wires or cables.

The illustrative hinge assembly 200 of FIG. 3 is shown in conjunction with an inner door 132 and an outer door 134, with the hinge assembly 200 mounted to the top 101, or upper portion of the doors 132, 134. Accordingly, the illustrated hinge assembly 200 may be considered an upper hinge assembly 200. Similarly, each of the components of the upper hinge assembly may also have the modified "upper." The preceding description of the hinge assembly components (e.g., door plate 202, cabinet plate 222, pivot pin 230, and thimble 240) equally apply to the components of the lower hinge assembly.

Inner door 132 includes an upper rotational bore 150 formed through an edge of the inner door 132 proximate to the top 101 and terminating at an inner portion of the inner door 132. The upper rotational bore 150 is configured to receive a first portion of the thimble 240, or upper thimble, such that an upper end 252 of the upper thimble 240 partially extends vertically above an upper edge 148 of the inner door 132. In an embodiment, the upper thimble 240 is fixed against axial and rotational displacement within the upper rotational bore 150. In some embodiments, the upper thimble 240 may be received within the upper rotational bore 150 for rotational displacement with respect to the inner door 132.

In the illustrative embodiment of FIGS. 3 and 4, first end 206 of door plate 202, or upper door plate, is fixedly attached to the outer door 134. The upper end 252 of upper thimble 240 extending above upper edge 148 of inner door 132 is received within first aperture 210, formed at the second end 208 of the upper door plate 202. Accordingly, outer door 134 is supported for rotation at the outer bearing surface 245 of the upper thimble 240.

Continuing with FIGS. 3 and 4, pivot pin 230 or upper pivot pin, provided at second end 228 of upper cabinet plate 222, is received in first passage 246 defined by the inner bearing surface 244 of upper thimble 240. Upper pivot pin 230 is received in the first passage 246 for rotation about upper thimble axis 248. Accordingly, upper thimble 240 and inner door 132 are supported for rotation about upper pivot pin 230. As illustrated, first end 226 of the upper cabinet plate 222 is fixedly attached to cabinet 120. Consequently, upper cabinet plate 222 does not rotate relative to the cabinet 120, allowing the inner door 132 to rotate about upper thimble axis 248 between a closed position (FIG. 1) and an open position (FIG. 2) about the upper hinge assembly 200. Additionally, outer door 134 is also rotatable about thimble axis 248 between a closed position (FIG. 1) and an open position (FIG. 2) about the upper hinge assembly 200.

As illustrated in FIG. 3, conduit 250 may be open to an interior portion of the inner door 132 and may provide a passageway suitable for routing of wires or cables, for example, to provide electrical power or communication to the door 128.

Figure 5:
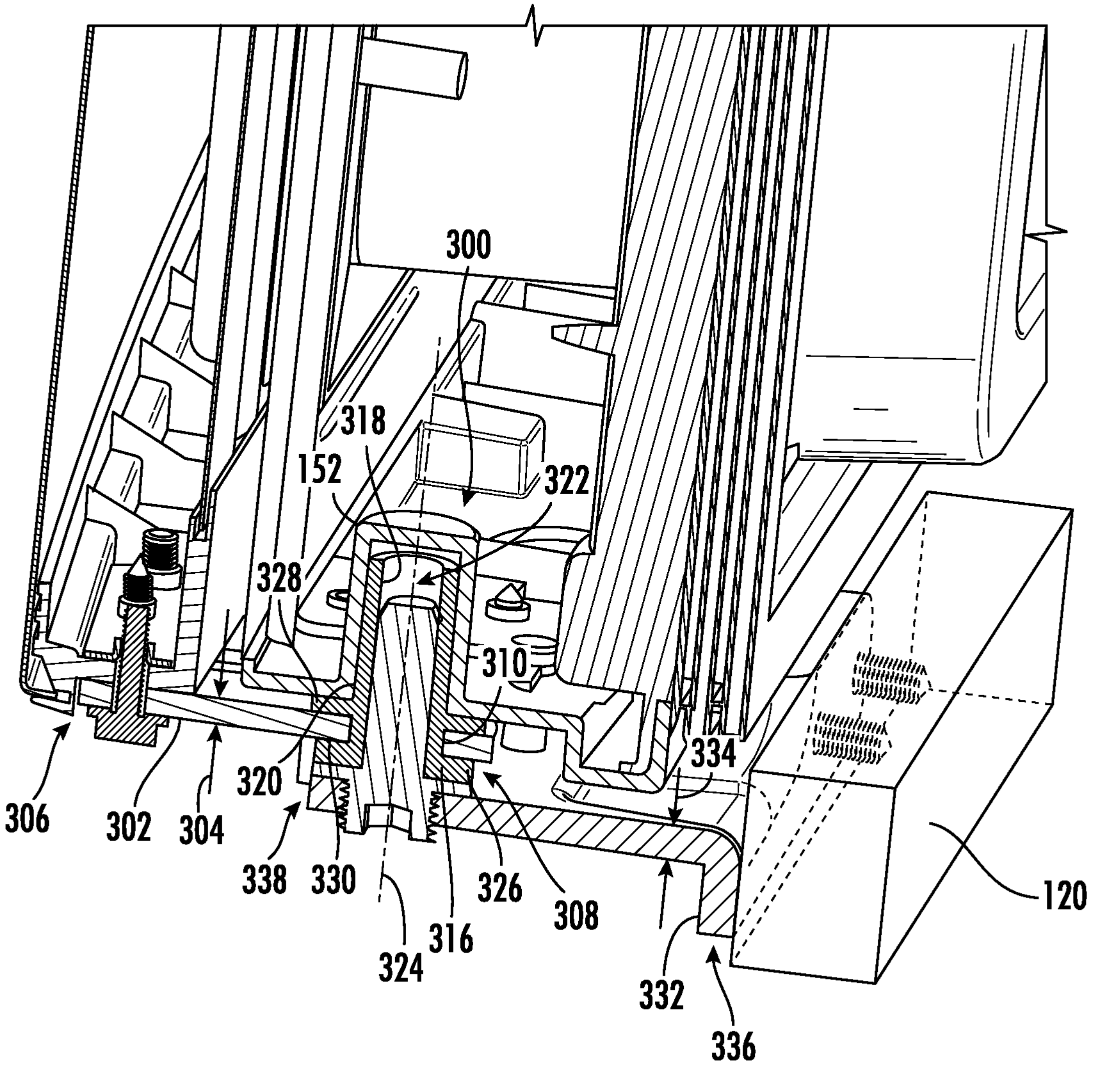
FIG. 5 represents a side sectional view of a hinge assembly mounted to a door-in-door assembly in accordance with another embodiment of the present disclosure.

FIG. 5 represents a side sectional view of an illustrative lower hinge assembly 300 in accordance with the present disclosure that may be used at the at the lower portion 112 of door 128. As illustrated, assembly 300 includes a lower door plate 302 defining a thickness 304, a first end 306 adapted for attachment to an outer door 134, and a first aperture 310 formed at the second end 308. As illustrated, first end 306 of the lower door plate 302 is fixedly attached to outer door 134. Second aperture 310 is formed through the thickness 304 of door plate 302 at the second end 308.

A lower thimble 316 may be provided in the second aperture 310. As best illustrated in FIG. 6, the lower thimble 316 may include a wall comprising an inner bearing surface 318 and an outer bearing surface 320, a third passage 322, and a lower thimble axis 324, the lower thimble axis 324 may be colinear with the upper thimble axis 248. A first collar 326 may be disposed on the outer bearing surface 320 proximate to the lower axial end of the lower thimble 316. A second collar 328 may be disposed on the outer bearing surface 320 axially spaced apart from the first collar 326. The first and second collars 326, 328 form a circumferential groove 330 around the perimeter of the outer bearing surface 320. The lower thimble 316 is received in the second aperture 310 such that the thickness 304 of the lower door plate 302 is received in the circumferential groove 330. In embodiments, the lower thimble 316 is formed, for example by injection molding, on the lower door plate 302. The lower thimble 316 may be rotationally fixed to the lower door plate 302. In some embodiments, the lower thimble 316 may be rotationally received in the second aperture 310.

Lower cabinet plate 332 includes a first end 336 adapted to be fixedly attached to a lower portion of a cabinet, for example cabinet 120 (shown schematically in FIG. 5), at a lower hinge position (i.e., proximate to the vertically lower portion of the door 128). As illustrated in FIG. 5, the first end 336 of the lower cabinet plate 332 is fixedly attached to a portion of the cabinet 120, for example with threaded fasteners. The second end 338 of the lower cabinet plate 332 defines a third aperture 340 formed through the thickness 334. According to an embodiment, the aperture 340 may include an internally threaded portion (i.e., the wall defining the third aperture 340 may include a threaded portion).

Figure 7:
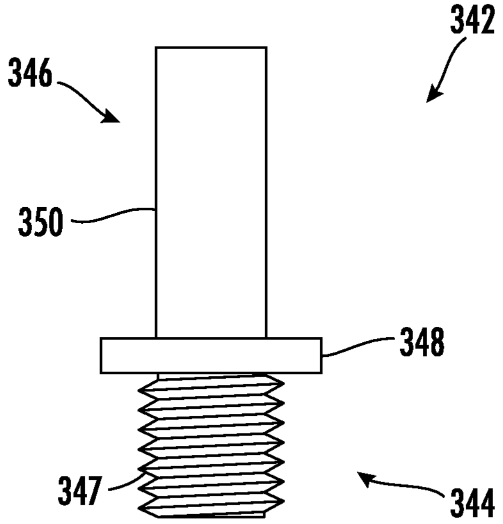
FIG. 7 represents a side view of a lower pivot in accordance with an embodiment of the present disclosure.

As illustrated in FIGS. 5 and 7, a lower pivot pin 342 is provided with a first end 344 configured to be received in the third aperture 340 and an opposite second end 346 including an outer bearing surface 350. In some embodiments, the first end 344 includes a corresponding externally threaded portion 347, with the thread corresponding to the internal thread provided at the third aperture 340 according to some embodiments. When corresponding internal and external threaded portions are provided as described, rotational displacement of the lower pivot pin 342 with respect to the lower cabinet plate 332 generates a linear displacement of the lower pivot pin 342 with respect to the lower cabinet plate 332. A flange 348 may be provided on the outer bearing surface 350 between the externally threaded portion 347 and the outer bearing surface 350. The flange 348 may extend around the perimeter of the lower pivot pin 342.

Returning to FIG. 5, a lower rotational bore 152 may be formed through a lower edge of the inner door 132 and terminating at an inner portion of the inner door 132 as a blind hole as illustrated. In other embodiments the lower rotational bore 152 may be open to the interior of the inner door 132. The lower rotational bore 152 may be configured to receive for rotation the outer bearing surface 320 of the lower thimble 316. In other embodiments, the lower thimble 316 may be fixed against rotation with respect to the lower rotational bore 152. The lower thimble 316 may be fixed in the lower bore 152 using joining techniques, such as adhesive bonding, interference fits, or fasteners. When the lower thimble 316 is received in the lower bore, the second collar 328 abuts the lower edge of inner door 132, providing a bearing interface between the collar 328 and the door 132.

The second end 346 of the lower pivot pin 342 is received in the third passage 322 defined by the inner bearing surface 318 of the lower thimble 316. When received as illustrated in FIG. 5, the flange 348 abuts the first collar 326 providing a bearing interface between the first collar 326 and the flange 348. As such, a portion of an upper surface of the flange 348 supports the lower thimble 316 for rotation about the lower thimble axis 324. In the illustrative embodiment of FIG. 5 including internal and external threads as described, rotational displacement of the lower pivot pin 342 with respect to the lower cabinet plate 332 generates a linear displacement of the lower pivot pin 342 with respect to the lower cabinet plate 332. The displacement is generally parallel to the lower thimble axis 324. The flange 348, bearing against the first collar 326 of the lower bushing 316 is displaced as well. Accordingly, the flange 348 displaces the lower bushing 316 the same, or substantially the same, linear distance. As a portion of the lower door plate 302 is received in the groove 330 of the lower bushing 316, the lower door plate 302 is also displaced. With the outer door 134 fixedly attached to the first end 306 of the lower door plate 302, rotational displacement of the lower pivot pin 342 modifies the spacing between the lower cabinet plate 332 and the lower door plate 302.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A hinge assembly for a door-in-door assembly, the hinge assembly comprising:
- a door plate defining a thickness and a first aperture through the thickness;
- a cabinet plate defining a thickness; and
- a thimble received for rotation within the first aperture, the thimble defining a thimble axis and comprising a wall having an inner bearing surface and an outer bearing surface, the inner bearing surface defining a first passage, the thimble comprising:
  - a first collar disposed on the outer bearing surface proximate an axial end of the outer bearing surface, and
  - a second collar disposed on the outer bearing surface, the second collar axially spaced from the first collar, the first collar and the second collar forming a circumferential groove around a perimeter of the outer bearing surface,
  - wherein the thimble is received in the first aperture such that the thickness of the door plate is received in the circumferential groove,
- wherein the door plate is supported for rotation at the outer bearing surface and the cabinet plate is supported for rotation at the inner bearing surface.

2. The hinge assembly of claim 1,
- wherein the cabinet plate comprises a pivot pin received for rotation in the first passage.

3. The hinge assembly of claim 2, wherein the door plate and the thimble are rotatable about the thimble axis.

4. The hinge assembly of claim 2, wherein the door plate further defines a first end configured for attachment to an outer door; and
- further wherein the first aperture is formed at a second end of the door plate.

5. The hinge assembly of claim 2, wherein the cabinet plate further defines a first end configured for attachment to a cabinet; and
- further wherein the pivot pin is disposed proximate to a second end of the cabinet plate.

6. The hinge assembly of claim 2,
- wherein the pivot pin comprises:
  - a first end received in a second aperture formed in the cabinet plate; and
  - a second end comprising an outer bearing surface, the second end received in the first passage.

7. The hinge assembly of claim 6, wherein the thimble is rotatably received in the first aperture.

8. The hinge assembly of claim 6, wherein the pivot pin is rotatably received in the first passage.

9. The hinge assembly of claim 6 wherein:
- the second aperture includes an internally threaded portion;
- the pivot pin includes a corresponding externally threaded portion at the first end and a flange formed on the outer bearing surface between the externally threaded portion and the second end; and
- wherein a rotational displacement of the pivot pin about the cabinet plate generates a linear displacement of the pivot pin with respect to the cabinet plate, the linear displacement generally parallel to the thimble axis.

10. The hinge assembly of claim 9 wherein a surface of the flange abuts the lower axial end of the thimble, further wherein the linear displacement of the pivot pin modifies a distance between the cabinet plate and the door plate.

11. The hinge assembly of claim 9 wherein a portion of an upper surface of the flange supports the thimble for rotation about the thimble axis.

12. A door-in-door assembly for a cabinet defining a chamber and an opening to the chamber, the door-in-door assembly comprising:
- an inner door defining an upper rotational bore and a lower rotational bore;
- an outer door;
- an upper hinge assembly comprising:
  - an upper thimble comprising an inner bearing surface defining a first passage and an outer bearing surface, wherein a first portion of the upper thimble is received in the upper rotational bore;
  - an upper door plate defining a thickness and a first aperture through the thickness, a portion of the outer bearing surface received for rotation in the first aperture;
  - an upper cabinet plate comprising an upper pivot pin, the upper pivot pin received in the first passage; and
- a lower hinge assembly comprising:
  - a lower door plate defining a thickness and a second aperture through the thickness;
  - a lower cabinet plate defining a thickness and a third aperture through the thickness; and
  - a lower thimble comprising an inner bearing surface defining a third passage and an outer bearing surface, a first collar disposed on the outer bearing surface of the lower thimble proximate to a lower axial end of the lower thimble, and a second collar disposed on the outer bearing surface of the lower thimble, the second collar axially spaced from the first collar, the first collar and the second collar forming a circumferential groove around a perimeter of the outer bearing surface of the lower thimble, wherein the lower thimble is received in the second aperture such that the thickness of the lower door plate is received in the circumferential groove,
- wherein the outer door is supported for rotation at the outer bearing surface of the upper thimble and the inner bearing surface of the upper thimble is supported for rotation at the upper pivot pin for rotation of the inner door.

13. The door-in-door assembly of claim 12, further comprising a lower pivot pin comprising:

an outer bearing surface;

a first end received in the third aperture; and a second end received in the third passage; and wherein the outer door is supported for rotation at the outer bearing surface of the lower thimble and the inner bearing surface of the lower thimble is supported for rotation at the lower pivot pin for rotation of the inner door.

14. The door-in-door assembly of claim 13, wherein:

the upper thimble defines an upper thimble axis;

the lower thimble defines a lower thimble axis; and wherein the upper thimble axis and the lower thimble axis are colinear.

15. The door-in-door assembly of claim 14, wherein the third aperture includes an internally threaded portion;

the lower pivot pin includes a corresponding externally threaded portion at the first end and a flange formed on the outer bearing surface between the externally threaded portion and the second end; and wherein a rotational displacement of the lower pivot pin generates a linear displacement of the lower pivot pin with respect to the lower cabinet plate, the linear displacement generally parallel to the lower thimble axis.

16. The door-in-door assembly of claim 13, wherein:

a first end of the upper cabinet plate is fixedly attached to an upper portion of the cabinet; and a first end of the lower cabinet plate is fixedly attached to a lower portion of the cabinet; and wherein the upper cabinet plate and the lower cabinet plate support the door-in-door assembly for rotation.

17. The door-in-door assembly of claim 12, wherein the upper pivot pin comprises a wall defining a second passage along a length of the upper pivot pin, wherein the first passage and the second passage cooperate to form a conduit.

18. The hinge assembly of claim 12, wherein the upper pivot pin is rotationally fixed to the upper cabinet plate.

19. The hinge assembly of claim 12, wherein the upper pivot pin comprises a wall defining a second passage along a length of the upper pivot pin.

20. The hinge assembly of claim 19, wherein the first passage and the second passage cooperate to form a conduit.

* * * * *